United States Patent
Yu et al.

(10) Patent No.: US 9,873,353 B1
(45) Date of Patent: Jan. 23, 2018

(54) SYSTEM AND METHOD FOR CONTROLLING CREEP TORQUE OF AN ELECTRIC VEHICLE

(71) Applicant: Bordrin Motor Corporation, Southfield, MI (US)

(72) Inventors: Xinbao Yu, Baoshan District (CN); Zhiwei Zhang, Shanghai (CN); Kai Zhang, Shanghai (CN)

(73) Assignee: BORDRIN MOTOR CORPORATION, Southfield, MI (US)

( * ) Notice: Subject to any disclaimer, the term of this patent is extended or adjusted under 35 U.S.C. 154(b) by 0 days.

(21) Appl. No.: 15/686,812

(22) Filed: Aug. 25, 2017

(30) Foreign Application Priority Data

Feb. 22, 2017 (CN) .............................. 2017 1 095616

(51) Int. Cl.
  B60L 15/20 (2006.01)
  F16H 63/50 (2006.01)
(52) U.S. Cl.
  CPC .......... B60L 15/2063 (2013.01); F16H 63/50 (2013.01); *B60L 2240/16* (2013.01);
  (Continued)
(58) Field of Classification Search
  CPC .............................. B60L 15/2063; F16H 63/50
  See application file for complete search history.

(56) References Cited

U.S. PATENT DOCUMENTS

| 9,399,408 B2 | 7/2016 | Jung | |
| 2007/0112496 A1* | 5/2007 | Ji | B60K 6/445 701/70 |

(Continued)

FOREIGN PATENT DOCUMENTS

CN 103522915 A 1/2014

*Primary Examiner* — Thomas G Black
*Assistant Examiner* — Sze-Hon Kong
(74) *Attorney, Agent, or Firm* — Brinks Gilson & Lione

(57) ABSTRACT

A system and method for controlling creep torque of an electric vehicle, where a vehicle control unit controls a motor by calculating creep torque needed by an electric vehicle. The method includes the following steps: reading a creep torque base value $T_q\_creep\_base$ of the vehicle; reading an acceleration parameter and a basic information parameter of the vehicle and obtaining by calculation a creep torque slope resistance compensation value $T_q\_slope$ of the vehicle according to the acceleration parameter and the basic information parameter; obtaining by calculation a raw creep torque value $T_q\_creep\_raw$ according to the creep torque base value $T_q\_creep\_base$ and the creep torque slope resistance compensation value $T_q\_slope$; reading a current gear of the vehicle and obtaining by calculation a creep torque compensation resistance value $T_q\_creep\_temp$ of the vehicle according to the gear; and obtaining, according to the raw creep torque value $T_q\_creep\_raw$ and the creep torque compensation resistance value $T_q\_creep\_temp$, a creep torque $T_q\_creep$ needed by the vehicle.

18 Claims, 4 Drawing Sheets

(52) U.S. Cl.
CPC ..... *B60L 2240/26* (2013.01); *B60L 2240/421* (2013.01); *B60L 2240/423* (2013.01); *B60L 2240/48* (2013.01)

(56) References Cited

U.S. PATENT DOCUMENTS

| | | | |
|---|---|---|---|
| 2009/0306860 A1* | 12/2009 | Sokoll | B60T 7/122 701/48 |
| 2010/0235043 A1 | 9/2010 | Seta et al. | |
| 2011/0029172 A1* | 2/2011 | Kwon | B60L 15/2009 701/22 |
| 2012/0150384 A1* | 6/2012 | Jung | B60W 30/18063 701/31.1 |
| 2013/0060433 A1* | 3/2013 | Maruyama | B60T 7/122 701/53 |
| 2013/0197731 A1* | 8/2013 | Schum | B60L 15/2063 701/22 |
| 2013/0288855 A1 | 10/2013 | Monsere | |
| 2014/0067240 A1* | 3/2014 | Yu | B60W 40/13 701/112 |
| 2016/0185254 A1* | 6/2016 | Ariyoshi | B60K 6/48 701/22 |
| 2017/0058808 A1* | 3/2017 | Gennard | B60W 30/18027 |

* cited by examiner

SYSTEM AND METHOD FOR CONTROLLING CREEP TORQUE OF AN ELECTRIC VEHICLE

PRIORITY CLAIM

This application claims the benefit of priority from Chinese Patent Application No. 201710095616.5 filed Feb. 22, 2017, which is incorporated by reference.

BACKGROUND

1. Field of the Invention

The present invention generally relates to systems and method controlling electric vehicles, such as automobiles, and in particular, to a system and method for controlling creep torque of an electric vehicle.

2. Description of Related Art

A creep control function of a conventional vehicle is usually implemented by an automatic transmission controller. Because an engine is limited to a minimum idling speed, implementation of the creep control function needs to include torque control and differential control. The automatic transmission controller implements the creep control function using clutch slip control (DCT/AMT) or torque converter coupling degree control (AT/CVT).

For an electric vehicle, because an electric motor is not limited to a minimum rotation speed, and many transmissions for these electric vehicles do not have clutches, a conventional vehicle creep control method is no longer applicable.

A method for controlling creep torque in a motor driven vehicle is described in U.S. Pat. No. 9,399,408. This patent discloses method that includes: a step of calculating a downhill gradient of a road; a step of calculating a filter time constant using the downhill gradient, a predetermined basic creep torque, a set speed, and a compensation coefficient of the predetermined basic creep torque corresponding to the set speed; and a variable control step of applying the calculated filter time constant to a filter, inputting the predetermined basic creep torque to the filter, and controlling a motor based on a torque value output from the filter as a request torque. Although an objective of controlling creep torque can be achieved by means of this method, the control method is complicated and a principle thereof is not intuitive.

A torque control method for preventing backward slipping of a blade electric vehicle on a slope with the Chinese Patent Application No. CN201310532701.5. This application discloses a process of using closed-loop PI for control and calibrating P (proportional) and I (integral) parameters at different motor rotation speeds, so that the electric vehicle obtains torque needed by driving within 0.3 seconds after a brake pedal is released, and rapidly achieves an ideal drive speed, thereby avoiding backward slipping after a driver releases a brake. In this method, the PI parameters need to be calibrated and are calibration values related to a motor rotation speed. Calibration is difficult and troublesome and therefore is not easily implemented.

SUMMARY

An objective of the present invention provides a system and method for controlling creep torque of an electric vehicle specific to the foregoing problem. The objective of the present invention may be implemented by the following technical solutions.

In the method for controlling creep torque of an electric vehicle, a vehicle control unit controls a motor by calculating creep torque needed by the electric vehicle. The method includes the following steps:

1) reading a creep torque base value $T_q\_creep\_base$ of the vehicle;

2) reading an acceleration parameter and a basic information parameter of the vehicle and obtaining by calculation a creep torque slope resistance compensation value $T_q\_slope$ of the vehicle according to the acceleration parameter and the basic information parameter;

3) obtaining by calculation a raw creep torque value $T_q\_creep\_raw$ according to the creep torque base value $T_q\_creep\_base$ obtained in step 1) and the creep torque slope resistance compensation value $T_q\_slope$ obtained in step 2);

4) reading a current gear of the vehicle and obtaining by calculation a creep torque compensation resistance value $T_q\_creep\_temp$ of the vehicle according to the gear; and 5) obtaining, according to the raw creep torque value $T_q\_creep\_raw$ obtained in step 3) and the creep torque compensation resistance value $T_q\_creep\_temp$ obtained in step 4), a creep torque $T_q\_creep$ needed by the vehicle.

Step 2) is may additionally include the steps of:

21) reading the acceleration parameter and the basic information parameter of the vehicle and obtaining by calculation a raw creep torque slope resistance compensation value $T_q\_slope\_raw$ of the vehicle; and 22) performing linear attenuation on the raw creep torque slope resistance compensation value $T_q\_slope\_raw$ obtained in step 21), to obtain the creep torque slope resistance compensation value $T_q\_slope$.

Step 21) may include the steps of:

211) reading the acceleration parameter of the vehicle and obtaining by calculation a gravitational acceleration component $Acc\_g$ of the vehicle; and 212) reading the basic information parameter of the vehicle, and obtaining by calculation the raw creep torque slope resistance compensation value $T_q\_slope\_raw$ with reference to the gravitational acceleration component $Acc\_g$ of the vehicle obtained in step 211).

The acceleration parameter includes a vehicle longitudinal acceleration sensor signal $Acc\_lgt$ and a wheel acceleration $Acc\_wheel$, and the basic information parameter includes a complete vehicle curb mass $Mass\_veh$ and a rolling tire radius $R\_tire$.

The gravitational acceleration component $Acc\_g$ is specifically:

$$Acc\_g = Acc\_lgt - Acc\_wheel.$$

The raw creep torque slope resistance compensation value $T_q\_slope\_raw$ is specifically:

$$T_q\_slope\_raw = Mass\_veh \times Acc\_g / R\_tire.$$

Step 3) may include the step of respectively filtering the creep torque base value $T_q\_creep\_base$ obtained in step 1) and the creep torque slope resistance compensation value $T_q\_slope$ obtained in step 2), and superposing results after filtering, to obtain the raw creep torque value $T_q\_creep\_raw$.

Step 4) may include the steps of:

41) reading a current gear of the vehicle;

42) calculating, according to the current gear of the vehicle, a motor reverse rotation speed relative to a drive gear when the vehicle is in a creep working condition; and 43) obtaining creep torque compensation resistance value $T_q\_creep\_temp$ of the vehicle according to the motor reverse rotation speed.

Step 5) may include the step of superposing the raw creep torque value $T_q\_creep\_raw$ obtained in step 3) and the creep torque compensation resistance value $T_q\_creep\_temp$ obtained in step 4), to obtain the creep torque $T_q\_creep$ needed by the vehicle.

Compared with the prior art, the present invention has the following beneficial effects:

In the method of the present invention, increase and decrease compensation is automatically performed on creep torque by detecting a gradient of a road and current parameters of a vehicle by a vehicle control unit, so that the vehicle has the same acceleration performance at a forward gear or a reverse gear and when being uphill, downhill, or on a level road. Control is performed by using an open loop, and calibration is simple. Compared with a conventional method, disclosed method is simple, intuitive, and is easily implemented.

Further objects, features, and advantages of this invention will become readily apparent to persons skilled in the art after a review of the following description, with reference to the drawings and claims that are appended to and form a part of this specification.

DETAILED DESCRIPTION

The present invention is described in detail concerning the accompanying drawings and specific embodiments below. The embodiments are implemented on the premise of technical solutions of the present invention, and detailed implementation manners and specific operation processes are provided. However, the protection scope of the present invention is not limited to the following embodiments.

Figure 1:
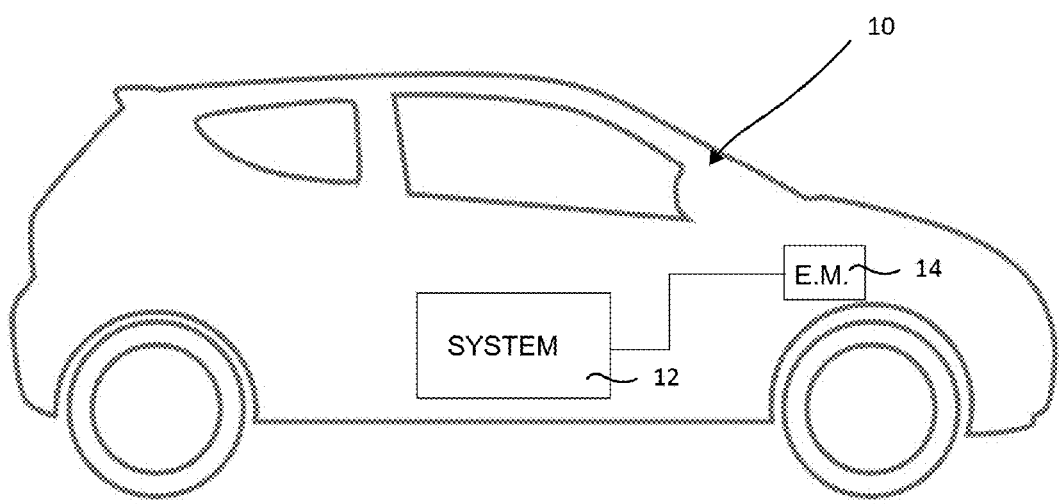
FIG. 1 illustrates an electric vehicle having a system for controlling creep torque of the electric vehicle.

Referring to FIG. 1, an electric vehicle 10 is shown. It should be understood that the electric vehicle 10 could be any type of vehicle capable of transporting persons or cargo from one point to another. While the illustration of the electric vehicle 10 shows an automobile, it should be understood that the electric vehicle 10 could take any one of a number of different forms. For example, the electric vehicle 10 could be a light truck, heavy duty truck, sport utility vehicle, commercial vehicle, tractor-trailer, and the like. Additionally, the electric vehicle 10 could be a farm tractor or implement mining vehicle, and the like. Again, emphasis is made that the electric vehicle 10 may take any one of a number of different forms and it should not be limited to this those shown.

The electric vehicle 10 includes a system 12 for controlling creep torque of the electric vehicle 10. The system 12 is in electrical communication with at least one electrical motor 14. It should be understood that while this example only shows the use of one electrical motor 14, the vehicle 10 may have multiple electrical motors. For example, the vehicle 10 may have an electrical motor for driving each wheel of the electric vehicle 10.

Figure 2:
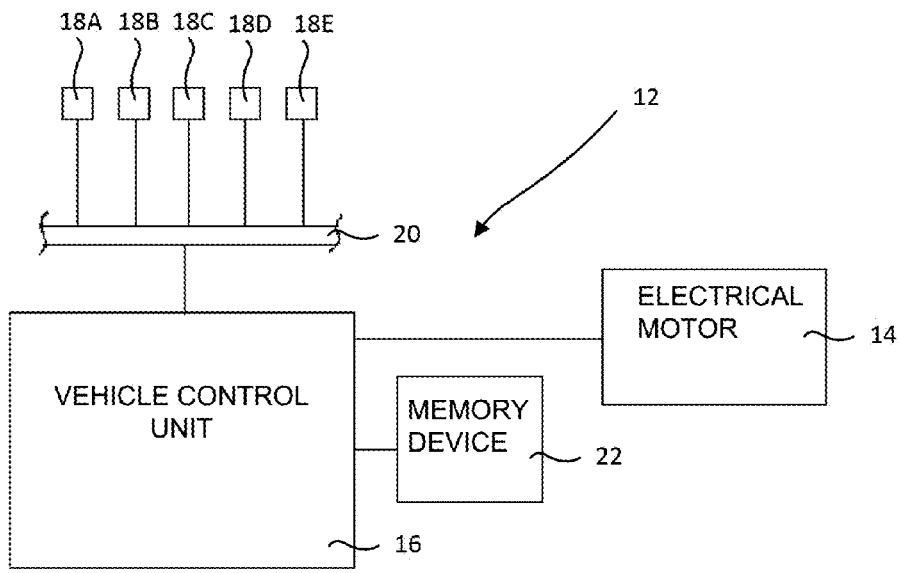
FIG. 2 provides a block diagram of the system for controlling creep torque of the electric vehicle.

Referring to FIG. 2, a more detailed view of the system 12 for controlling creep torque of the electric vehicle is shown. Here, the system 12 includes a vehicle control unit 16. The vehicle control unit 16 is a control unit capable and configured to control the electrical motor 14. As such, the vehicle control unit 16 may be a collection of one or more microprocessors that send and receive information from various vehicle subsystems so as to control those various vehicle subsystems, including, in this case, the electrical motor 14 which propels the electric vehicle.

In addition to being in communication with the electrical motor 14, the vehicle control unit 16 may be in communication with the plurality of sensors or vehicle subsystems 18A-18E that provide information relating to the electric vehicle 10. For example, element 18A may be a sensor, such as an accelerometer, capable of determining the acceleration of the vehicle in any direction, such as laterally or longitudinally. Element 18B may be a sensor or vehicle subsystem that is capable of determining what gear the electric vehicle is in.

Element 18C may be a sensor configured to determine the speed of one or more wheels of the electric vehicle 10. Element 18D may be may be a sensor vehicle subsystem that can determine the rotational speed of the electric motor 14 of the vehicle 10. Finally, Element 18E may be a sensor capable of determining other variables, such as the radius of one or more wheels, the curb mass (curb weight), or wheel acceleration of the vehicle 10.

The sensors or vehicle subsystems 18A-18E may be in communication with the vehicle control unit 16 by a direct connection or may be connected to the vehicle control unit 16 via a bus 20 as shown. The bus 20 may be any type of bus capable of transmitting information between different electrical elements, such as the sensors or vehicle subsystems 18A-18E and the vehicle control unit 16. For example, the bus 20 may be a controller area network type bus commonly found in automobiles.

A memory device 22 may also be in communication with the vehicle control unit 16. The memory device 22 may take the form of any device capable of storing and/or transmitting digital information. For example, the memory device 22 may be a solid state memory device, magnetic memory device, or any other suitable device. Furthermore, it should be understood that the memory device 22 may be incorporated within the vehicle control unit 16. The memory device 22 is configured to store data from the various vehicle subsystems or sensors 18A-18E and/or instructions for instructing the vehicle control unit 16 to execute any one of the methods disclosed in this description.

Figure 3:
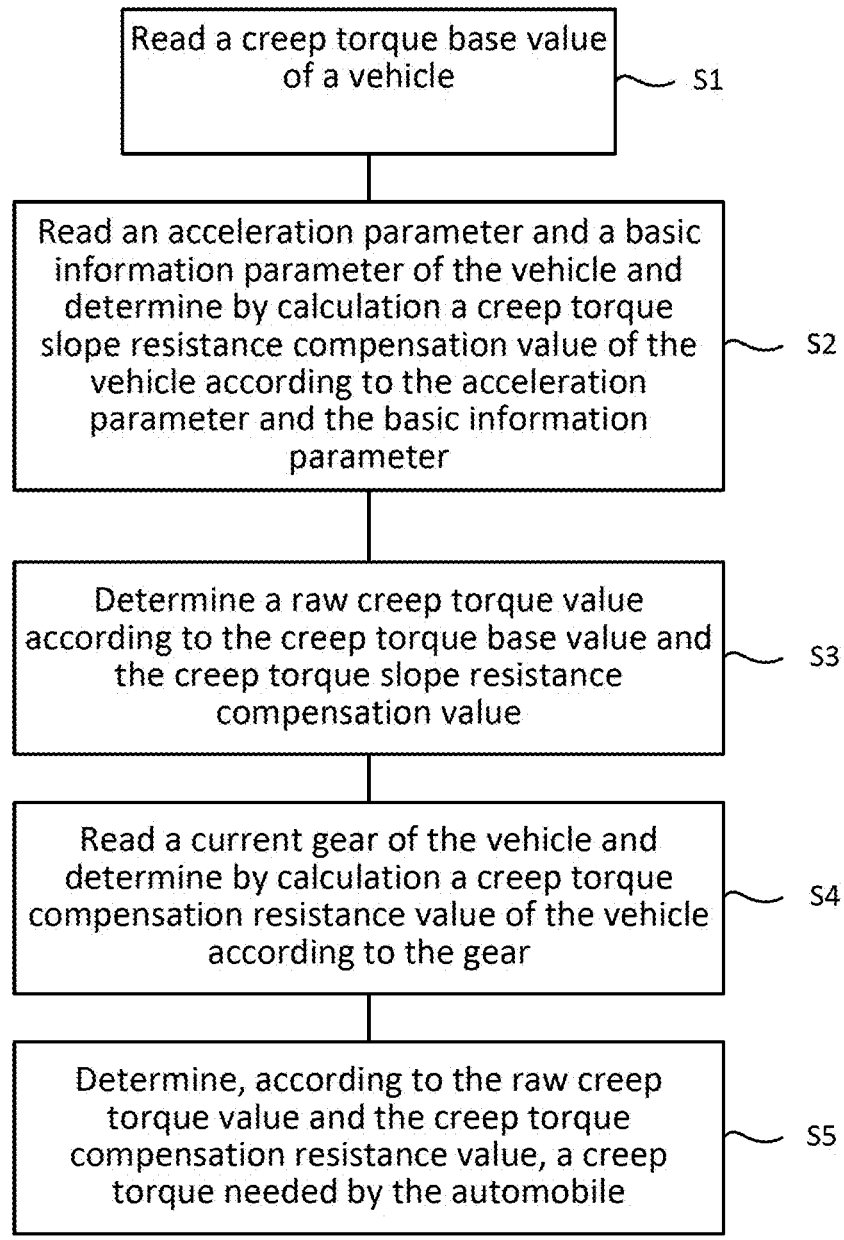
FIGS. 3-6 are flowcharts of the methods for controlling creep torque of the electric vehicle.
Figure 4:
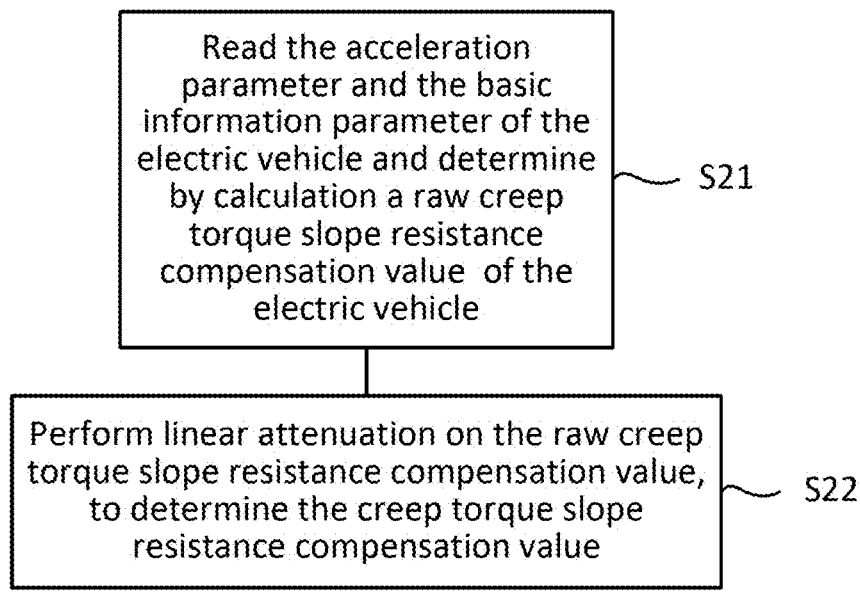
Figure 5:
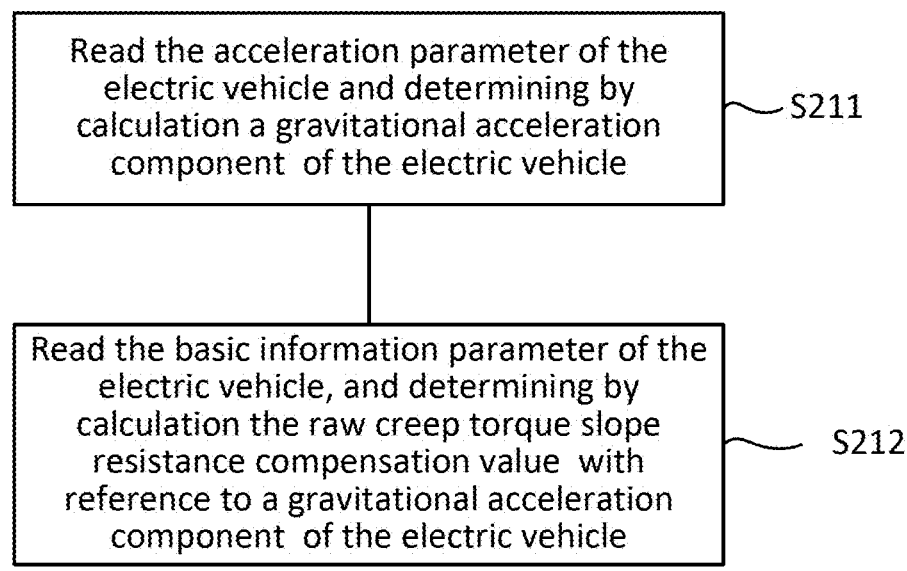
Figure 6:
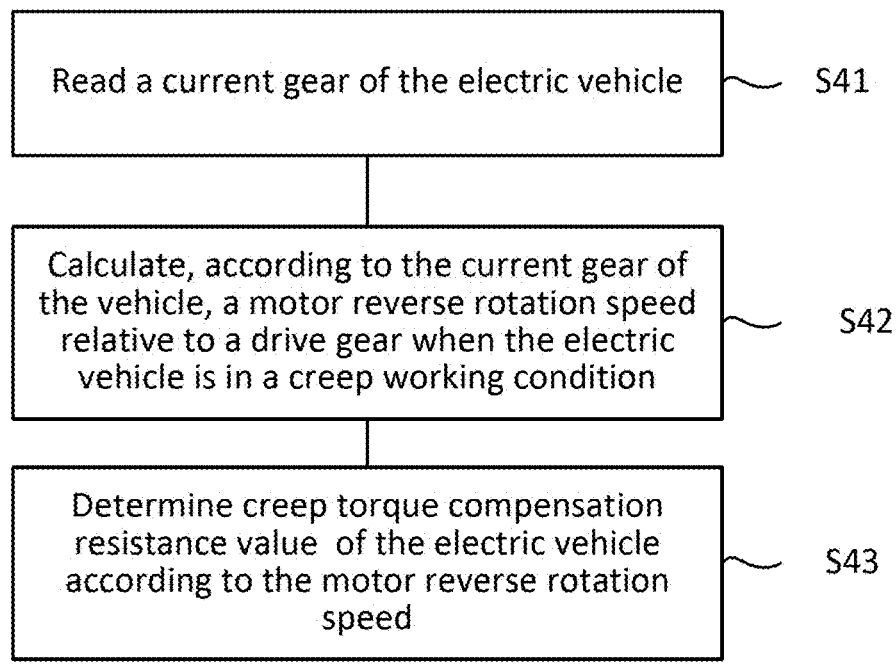

As to the methods for controlling creep torque of an electric vehicle, reference is made to FIGS. 4-6. As stated before, any of the methods disclosed in these figures may be embodied in instructions that are executed by the vehicle control unit 16. As shown in FIG. 3, this embodiment provides a method for controlling creep torque of an electric vehicle, where a vehicle control unit controls a motor by calculating creep torque needed by the electric vehicle, and the method includes the following steps:

1) Read a creep torque base value $T_q\_creep\_base$ of the vehicle (Step S1 of FIG. 3).

2) Read an acceleration parameter and a basic information parameter of the vehicle and obtain by calculation a creep torque slope resistance compensation value $T_q\_slope$ of the vehicle according to the acceleration parameter and the basic information parameter (Step S2 of FIG. 3):

21) Read the acceleration parameter and the basic information parameter of the vehicle and obtain by calculation a raw creep torque slope resistance compensation value $T_q$_slope_raw of the vehicle (Step S21 of FIG. 4):

211) Read the acceleration parameter (including a vehicle longitudinal acceleration sensor signal Acc_1gt and a wheel acceleration Acc_wheel) of the vehicle and obtain by calculation a gravitational acceleration component Acc_g of the vehicle (Step S211 of FIG. 5):

Acc_g=Acc_1gt−Acc_wheel.

212) Read the basic information parameter (including a complete vehicle curb mass Mass_veh and a tire rolling radius R_tire) of the vehicle, and obtain by calculation the raw creep torque slope resistance compensation value $T_q$_slope_raw with reference to the gravitational acceleration component Acc_g of the vehicle obtained in step 21) (Step S211 of FIG. 5):

$T_q$_slope_raw=Mass_veh×Acc_g/R_tire.

22) Perform linear attenuation on the raw creep torque slope resistance compensation value $T_q$_slope_raw obtained in step 21), to obtain the creep torque slope resistance compensation value $T_q$_slope (Step S22 of FIG. 4).

In this embodiment, the vehicle control unit obtains an attenuation coefficient by looking up a vehicle speed one-dimensional table and multiplies the raw creep torque slope resistance compensation value $T_q$_slope_raw and the attenuation coefficient to obtain the creep torque slope resistance compensation value $T_q$_slope. However, linear attenuation may also be implemented in other manners.

3) Obtain by calculation a raw creep torque value $T_q$_creep_raw according to the creep torque base value $T_q$_creep_base obtained in step 1) and the creep torque slope resistance compensation value $T_q$_slope obtained in step 2) (Step S3 of FIG. 3):

Respectively filter the creep torque base value $T_q$_creep_base obtained in step 1) and the creep torque slope resistance compensation value $T_q$_slope obtained in step 2), and superpose results after filtering, to obtain the raw creep torque value $T_q$_creep_raw.

4) Read a current gear of the vehicle and obtain by calculation a creep torque compensation resistance value $T_q$_creep_temp of the vehicle according to the gear (Step S4 of FIG. 3):

41) Read a current gear of the vehicle (Step S41 of FIG. 6).

42) Calculate, according to the current gear of the vehicle, a motor reverse rotation speed relative to a drive gear when the vehicle is in a creep working condition (Step S42 of FIG. 6).

43) Obtain creep torque compensation resistance value $T_q$_creep_temp of the vehicle according to the motor reverse rotation speed (Step S43 of FIG. 6).

In this embodiment, after the motor reverse rotation speed is obtained, the creep torque compensation resistance value $T_q$_creep_temp of the vehicle may be obtained according to a motor reverse rotation speed look-up table, but the method for obtaining of the creep torque compensation resistance value $T_q$_creep_temp is not limited to only this method.

5) Obtain, according to the raw creep torque value $T_q$_creep_raw obtained in step 3) and the creep torque compensation resistance value $T_q$_creep_temp obtained in step 4), a creep torque $T_q$_creep needed by the vehicle:

Superpose the raw creep torque value $T_q$_creep_raw obtained in step 3) and the creep torque compensation resistance value $T_q$_creep_temp obtained in step 4), to obtain the creep torque $T_q$_creep_needed by the vehicle.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. A method for controlling creep torque of an electric vehicle, wherein a vehicle control unit controls a motor by calculating creep torque needed by the electric vehicle, and the method comprises the following steps:
   1) reading a creep torque base value $T_q$_creep_base of the electric vehicle;
   2) reading an acceleration parameter and a basic information parameter of the electric vehicle and determining by calculation a creep torque slope resistance compensation value $T_q$_slope of the electric vehicle according to the acceleration parameter and the basic information parameter;
   3) determining a raw creep torque value $T_q$_creep_raw according to the creep torque base value $T_q$_creep_base read in step 1) and the creep torque slope resistance compensation value $T_q$_slope determined in step 2);
   4) reading a current gear of the electric vehicle and determining by calculation a creep torque compensation resistance value $T_q$_creep_temp of the electric vehicle according to the gear; and
   5) determining, according to the raw creep torque value $T_q$_creep_raw determined in step 3) and the creep torque compensation resistance value $T_q$_creep_temp determined in step 4), a creep torque $T_q$_creep needed by the electric vehicle.

2. The method for controlling creep torque of an electric vehicle according to claim 1, wherein step 2) further comprises the steps of:
   21) reading the acceleration parameter and the basic information parameter of the electric vehicle and determining by calculation a raw creep torque slope resistance compensation value $T_q\_slope\_raw$ of the electric vehicle; and 22) performing linear attenuation on the raw creep torque slope resistance compensation value $T_q\_slope\_raw$ determined in step 21), to determine the creep torque slope resistance compensation value $T_q\_slope$.

3. The method for controlling creep torque of an electric vehicle according to claim 2, wherein step 21) further comprises the steps of:
   211) reading the acceleration parameter of the electric vehicle and determining by calculation a gravitational acceleration component Acc_g of the electric vehicle; and
   212) reading the basic information parameter of the electric vehicle, and determining by calculation the raw creep torque slope resistance compensation value $T_q\_slope\_raw$ with reference to a gravitational acceleration component Acc_g of the electric vehicle determined in step 211).

4. The method for controlling creep torque of an electric vehicle according to claim 3, wherein the acceleration parameter comprises an vehicle longitudinal acceleration sensor signal Acc_1gt and a wheel acceleration Acc_wheel, and the basic information parameter comprises a complete vehicle curb mass Mass_veh and a tire rolling radius R_tire.

5. The method for controlling creep torque of an electric vehicle according to claim 4, wherein the gravitational acceleration component Acc_g is specifically:

Acc_g=Acc_1gt–Acc_wheel.

6. The method for controlling creep torque of an electric vehicle according to claim 4, wherein the raw creep torque slope resistance compensation value $T_q\_slope\_raw$ is:

$T_q\_slope\_raw = Mass\_veh \times Acc\_g/R\_tire$.

7. The method for controlling creep torque of an electric vehicle according to claim 1, further comprising the step of the determining creep torque compensation resistance value $T_q\_creep\_temp$ of the electric vehicle according to the motor reverse rotation speed.

8. The method for controlling creep torque of an electric vehicle according to claim 1, wherein step 4) further comprises the steps of:
   42) calculating, according to the current gear of the electric vehicle, a motor reverse rotation speed relative to a drive gear when the electric vehicle is in a creep working condition; and
   43) determining the creep torque compensation resistance value $T_q\_creep\_temp$ of the electric vehicle according to the motor reverse rotation speed.

9. The method for controlling creep torque of an electric vehicle according to claim 1, wherein step 5) further comprises the step of superposing the raw creep torque value $T_q\_creep\_raw$ determined in step 3) and the creep torque compensation resistance value $T_q\_creep\_temp$ determined in step 4), to determine the creep torque $T_q\_creep$ needed by the electric vehicle.

10. A system for controlling creep torque of an electric vehicle, the system comprising:
   a vehicle control unit;
   an electrical motor in communication with the vehicle control unit, the vehicle control unit configured to control the electrical motor;
   an accelerometer in communication with the vehicle control unit, the accelerometer configured to measure the lateral acceleration of the electric vehicle;
   wherein the vehicle control unit is configured to:
   1) read a creep torque base value $T_q\_creep\_base$ of the electric vehicle;
   2) read an acceleration parameter and a basic information parameter of the electric vehicle and determining by calculation a creep torque slope resistance compensation value $T_q\_slope$ of the electric vehicle according to the acceleration parameter and the basic information parameter;
   3) determine a raw creep torque value $T_q\_creep\_raw$ according to the creep torque base value $T_q\_creep\_base$ read in step 1) and the creep torque slope resistance compensation value $T_q\_slope$ determined in step 2);
   4) read a current gear of the electric vehicle and determining by calculation a creep torque compensation resistance value $T_q\_creep\_temp$ of the electric vehicle according to the gear; and
   5) determine, according to the raw creep torque value $T_q\_creep\_raw$ determined in step 3) and the creep torque compensation resistance value $T_q\_creep\_temp$ determined in step 4), a creep torque $T_q\_creep$ needed by the electric vehicle.

11. The system for controlling creep torque of an electric vehicle of claim 10, wherein the vehicle control unit is further configured to:
   21) read the acceleration parameter and the basic information parameter of the electric vehicle and determining by calculation a raw creep torque slope resistance compensation value $T_q\_slope\_raw$ of the electric vehicle; and
   22) perform linear attenuation on the raw creep torque slope resistance compensation value $T_q\_slope\_raw$ determined in step 21), to determine the creep torque slope resistance compensation value $T_q\_slope$.

12. The system for controlling creep torque of an electric vehicle according to claim 11, wherein the vehicle control unit is further configured to:
   211) read the acceleration parameter of the electric vehicle and determining by calculation a gravitational acceleration component Acc_g of the electric vehicle; and
   212) read the basic information parameter of the electric vehicle, and determining by calculation the raw creep torque slope resistance compensation $T_q\_slope\_raw$ value q with reference to a gravitational acceleration component Acc_g of the electric vehicle determined in step 211).

13. The system for controlling creep torque of an electric vehicle according to claim 12, wherein the acceleration parameter comprises a vehicle longitudinal acceleration sensor signal Acc_1gt and a wheel acceleration Acc_wheel, and the basic information parameter comprises a complete vehicle curb mass Mass_veh and a tire rolling radius R_tire.

14. The system for controlling creep torque of an electric vehicle according to claim 13, wherein the gravitational acceleration component Acc_g is specifically:

Acc_g=Acc_1gt–Acc_wheel.

15. The system for controlling creep torque of an electric vehicle according to claim 13, wherein the raw creep torque slope resistance compensation value $T_q\_slope\_raw$ is:

$T_q\_slope\_raw = Mass\_veh \times Acc\_g/R\_tire$.

16. The system for controlling creep torque of an electric vehicle according to claim 10, wherein the vehicle control unit is further configured to determine the creep torque compensation resistance value $T_q\_creep\_temp$ of the electric vehicle according to the motor reverse rotation speed.

17. The system for controlling creep torque of an electric vehicle according to claim 10, wherein the vehicle control unit is further configured to:
   42) calculate, according to the current gear of the vehicle, a motor reverse rotation speed relative to a drive gear when the electric vehicle is in a creep working condition; and
   43) determine the creep torque compensation resistance value $T_q\_creep\_temp$ of the electric vehicle according to the motor reverse rotation speed.

18. The system for controlling creep torque of an electric vehicle according to claim 10, wherein the vehicle control unit is further configured to superpose the raw creep torque value $T_q\_creep\_raw$ determined in step 3) and the creep torque compensation resistance value $T_q\_creep\_temp$ determined in step 4), to determine the creep torque $T_q\_creep$ needed by the electric vehicle.

* * * * *